United States Patent
Petrou et al.

(10) Patent No.: US 11,041,781 B2
(45) Date of Patent: Jun. 22, 2021

(54) REMOTE CASTER BEARING SENSING SYSTEM AND METHOD

(71) Applicant: Deublin Company, Waukegan, IL (US)

(72) Inventors: Anton A. Petrou, Hawthorn Woods, IL (US); Lu Han, Vernon Hills, IL (US)

(73) Assignee: Deublin Company, Waukegan, IL (US)

( * ) Notice: Subject to any disclaimer, the term of this patent is extended or adjusted under 35 U.S.C. 154(b) by 0 days.

(21) Appl. No.: 16/747,751

(22) Filed: Jan. 21, 2020

(65) Prior Publication Data

US 2020/0232881 A1    Jul. 23, 2020

Related U.S. Application Data

(60) Provisional application No. 62/794,855, filed on Jan. 21, 2019, provisional application No. 62/853,846, filed on May 29, 2019.

(51) Int. Cl.
*G01M 13/04* (2019.01)
*B21B 1/22* (2006.01)
(Continued)

(52) U.S. Cl.
CPC ............. *G01M 13/045* (2013.01); *B21B 1/22* (2013.01); *B21B 2001/225* (2013.01);
(Continued)

(58) Field of Classification Search
CPC .... B21B 1/22; B21B 1/26; B21B 1/34; B21B 31/07; B21B 31/076; B21B 2001/225; G01M 13/045; F16C 19/527; F16C 19/54
See application file for complete search history.

(56) References Cited

U.S. PATENT DOCUMENTS

| 5,666,837 A * | 9/1997 | Kajiwara | B21B 13/023 |
| | | | 72/14.4 |
| 2001/0037685 A1* | 11/2001 | Bode | B21B 31/07 |
| | | | 73/593 |

(Continued)

FOREIGN PATENT DOCUMENTS

| EP | 0 039 808 A1 | 11/1981 | |
| JP | 61189315 A * | 8/1986 | B21B 38/00 |

(Continued)

OTHER PUBLICATIONS

International Patent Application No. PCT/US2020/014370, Search Report dated (Apr. 9, 2020).

*Primary Examiner* — Phillip A Johnson
(74) *Attorney, Agent, or Firm* — Leydig, Voit & Mayer, Ltd.

(57) ABSTRACT

A rotary union adapted for connection on a support segment for a shaft includes a sensor disposed within a sensor housing, the sensor housing connected to the housing of the rotary union, and a sound conduit having first and second ends, the first end of the sound conduit being connected to the sensor housing, and the second end of the sound conduit being adapted to be connected to a second support segment for the shaft opposite the first support segment along the shaft, wherein the sensor includes a sensing element in physical contact with the first end of the sound conduit, the sensing element configured to provide a signal in response to vibration present along the sound conduit.

20 Claims, 11 Drawing Sheets

(51) Int. Cl.
*F16C 19/52* (2006.01)
*G01M 13/045* (2019.01)
(52) U.S. Cl.
CPC ........ *F16C 19/527* (2013.01); *F16C 2233/00* (2013.01); *F16C 2322/12* (2013.01)

(56) References Cited

U.S. PATENT DOCUMENTS

| | | | |
|---|---|---|---|
| 2001/0039835 A1* | 11/2001 | Scholl | F16C 19/542 73/593 |
| 2003/0048962 A1* | 3/2003 | Sato | B61K 9/04 384/448 |
| 2009/0059724 A1 | 3/2009 | Scanlon | |
| 2011/0243712 A1 | 10/2011 | Andersson et al. | |
| 2013/0298686 A1 | 11/2013 | Royer et al. | |
| 2017/0219144 A1 | 8/2017 | Petrou et al. | |

FOREIGN PATENT DOCUMENTS

| | | | | |
|---|---|---|---|---|
| JP | 61199505 A | * | 9/1986 | ............. B21B 31/07 |
| JP | 04120435 A | * | 4/1992 | ........... B21B 38/008 |

\* cited by examiner

REMOTE CASTER BEARING SENSING SYSTEM AND METHOD

CROSS REFERENCE TO RELATED APPLICATIONS

The present application claims the benefit of U.S. Provisional Patent Application Ser. No. 62/794,855, filed on Jan. 21, 2019, and U.S. Provisional Patent Application Ser. No. 62/853,846, filed on May 29, 2019, which are incorporated herein in their entirety by this reference.

BACKGROUND OF THE INVENTION

In continuous casting of steel slabs operations, water is used to cool various rollers that convey and press a steel slab into desired shapes, both in initial stages of solidification and also in subsequent steps as the steel bar or slab continues to cool. These rollers are in direct contact with the newly solidified surface of the metal. Water cooling can affect product quality by (1) controlling the heat removal rate that creates and cools the solid shell and (2) generating thermal stresses and strains inside the solidified metal. In a typical application, water or steam at a selected temperature may pass through the rollers to control the temperature and cooling rate of the metal.

In the past, water or steam was supplied to a rotary union that connects a fluid source with the interior, usually hollow cavity of a roller. The presence of the cooling water within the roller can be a critical part of the manufacturing process. For example, the absence of adequate cooling at an initial state of steel slab formation may cause excessive temperature gradients in subsequent cooling steps, which can lead to uneven cooling and crystallization of the steel structure on the surface of the slab. Such conditions may occur, for example, if a rotary union supplying water or steam to a roller fails. If the failure is not detected in time, a considerable amount of steel produced may take on undesired properties and need to be re-produced, which can cause considerable cost and expense for the steel manufacturer.

Moreover, the union providing water to the roller may also provide the bearings such as roller bearings around which the roller may be mounted for operation. Failure of the bearings may have an appreciable effect on both the shape and movement of the steel slab through the various manufacturing stages.

BRIEF SUMMARY OF THE INVENTION

The present disclosure describes systems and methods for sensing a health state of a union and process bearings for use in extreme environments such as in a steel manufacturing process, where high temperatures are present in the operating environment. The sensing system is externally mounted onto a union and uses acoustic sensors and acoustic conduits to sense noise caused by grinding or an imbalance in the operating union or in the process bearings, which, for example, support process rollers. The sound conduits are configured to target a listening area for the sensor, which is remote from the sensor. With the use of artificial intelligence, or other processing or modeling techniques, the signals received from the operating union may be analyzed so that a failure may be avoided by predicting an operating state of the union before an actual failure. Information about the union may be relayed to an operator in time for service or replacement of the union before a failure that may affect the manufacturing process is manifested.

BRIEF DESCRIPTION OF THE SEVERAL VIEWS OF THE DRAWINGS

FIG. 8 is a schematic view of a rotary union having a sensor system thereon in accordance with the disclosure.

DETAILED DESCRIPTION OF THE INVENTION

Figure 1:
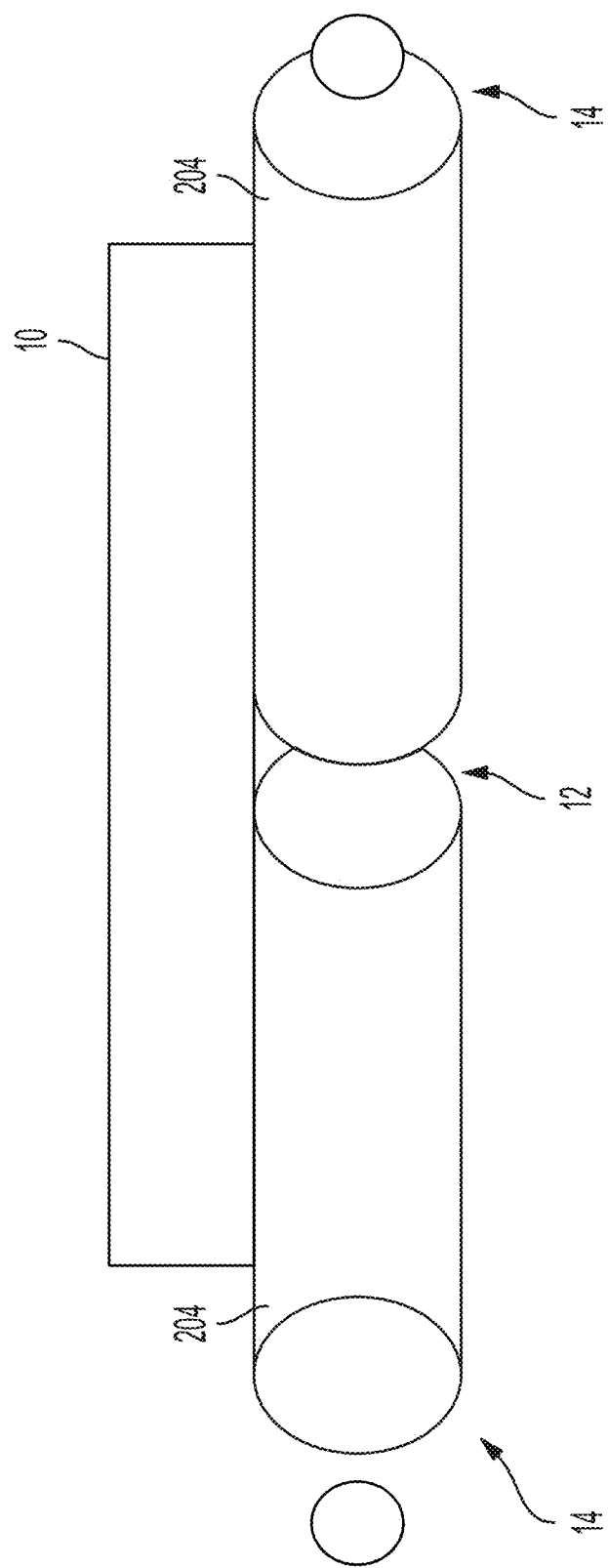
FIG. 1 is a schematic view of an operating environment for a sensor system in accordance with the disclosure.

A schematic view of a manufacturing process for a steel slab is shown in FIG. 1. As can be seen from this illustration, the steel slab 10, which is shown in cross section, travels over rollers 204. The rollers 204 are in opposed relation and rotate about a rotation axis. The rotation axes of the two rollers are collinear. For sake of illustration, at a particular portion of the path of the steel slab, a temperature at an area 12 between the rollers may be at around 500 deg. C., while the temperature at the outer end faces of the rollers 14 may be at around 70 deg. C. Each roller may include a roller bearing at either end. Each roller may further be hollow such that water, steam, oil or another liquid may pass through the roller to both cool and also control the temperature of the outer shell of the steel slab. In the illustrated embodiment, two rotary unions (denoted by circles) are disposed at an outer ends of the two rollers along the rotational axis. The two rotary unions provide an inlet or outlet for water or another fluid provided continuously through the rollers during operation.

Figure 2:
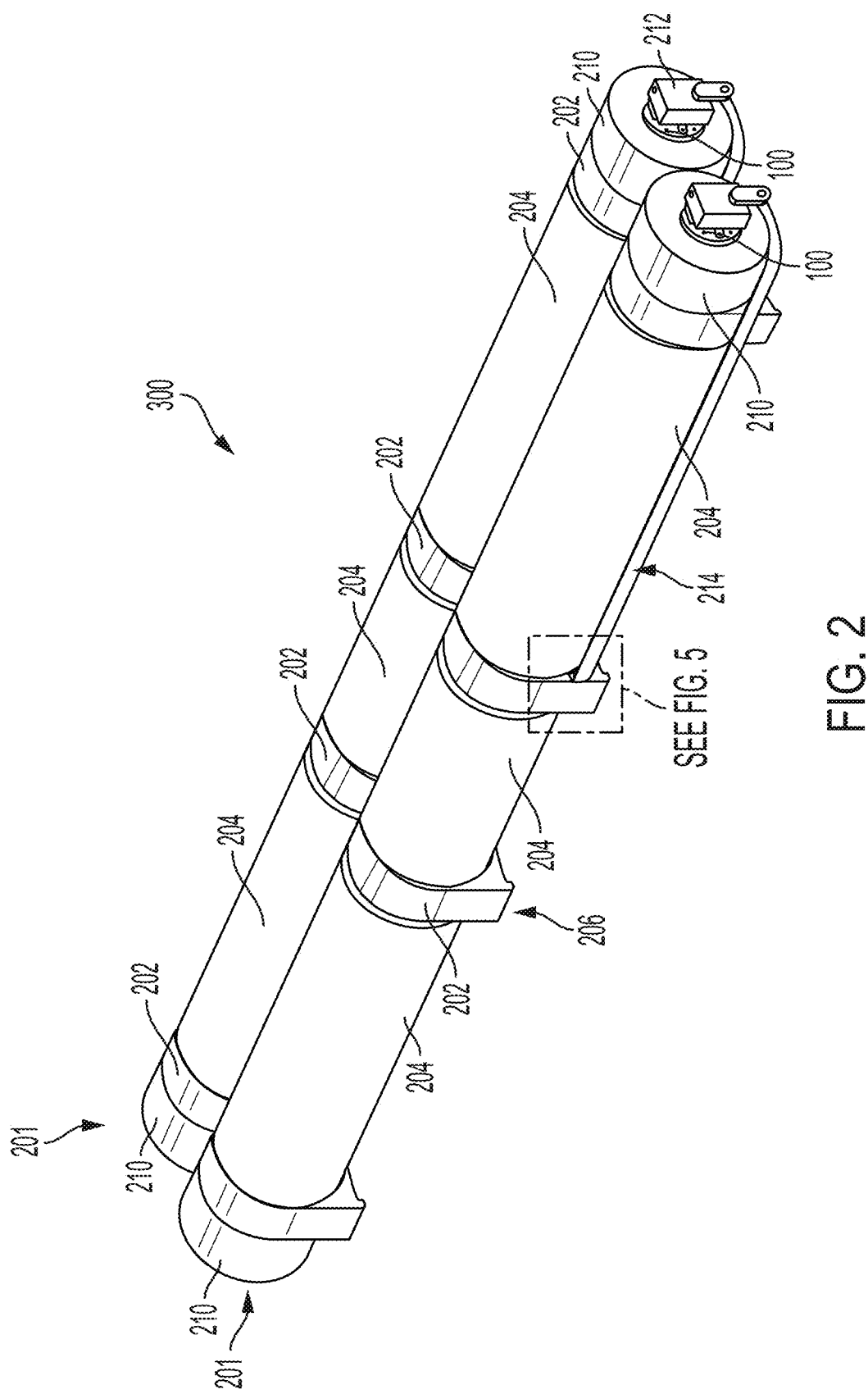
FIG. 2 is an outline view of a pair of rollers having sensors according to an alternative embodiment of the disclosure.
Figure 3:
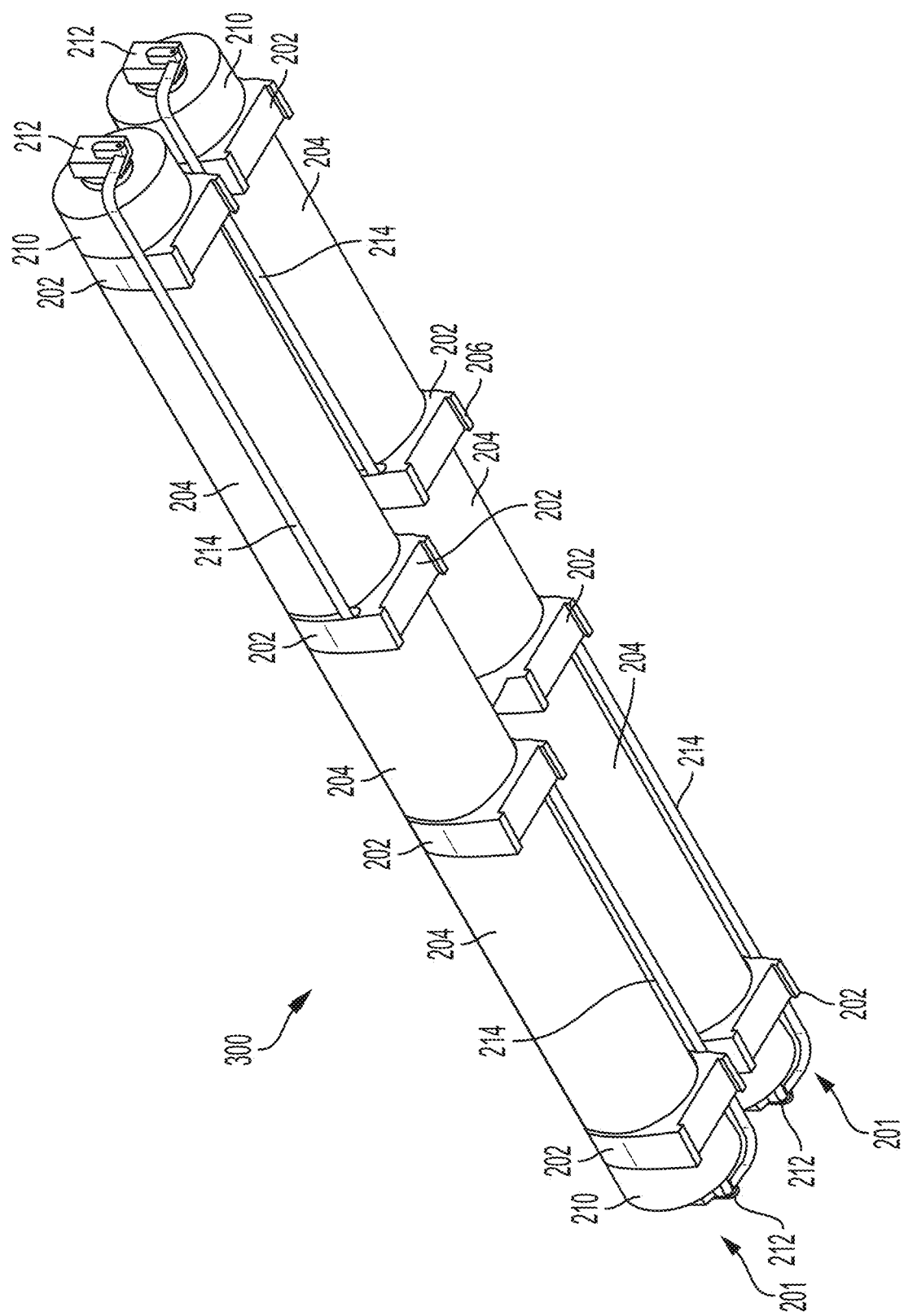
FIG. 3 is an outline view of the pair of rollers of FIG. 2 from a bottom perspective.
Figure 4:
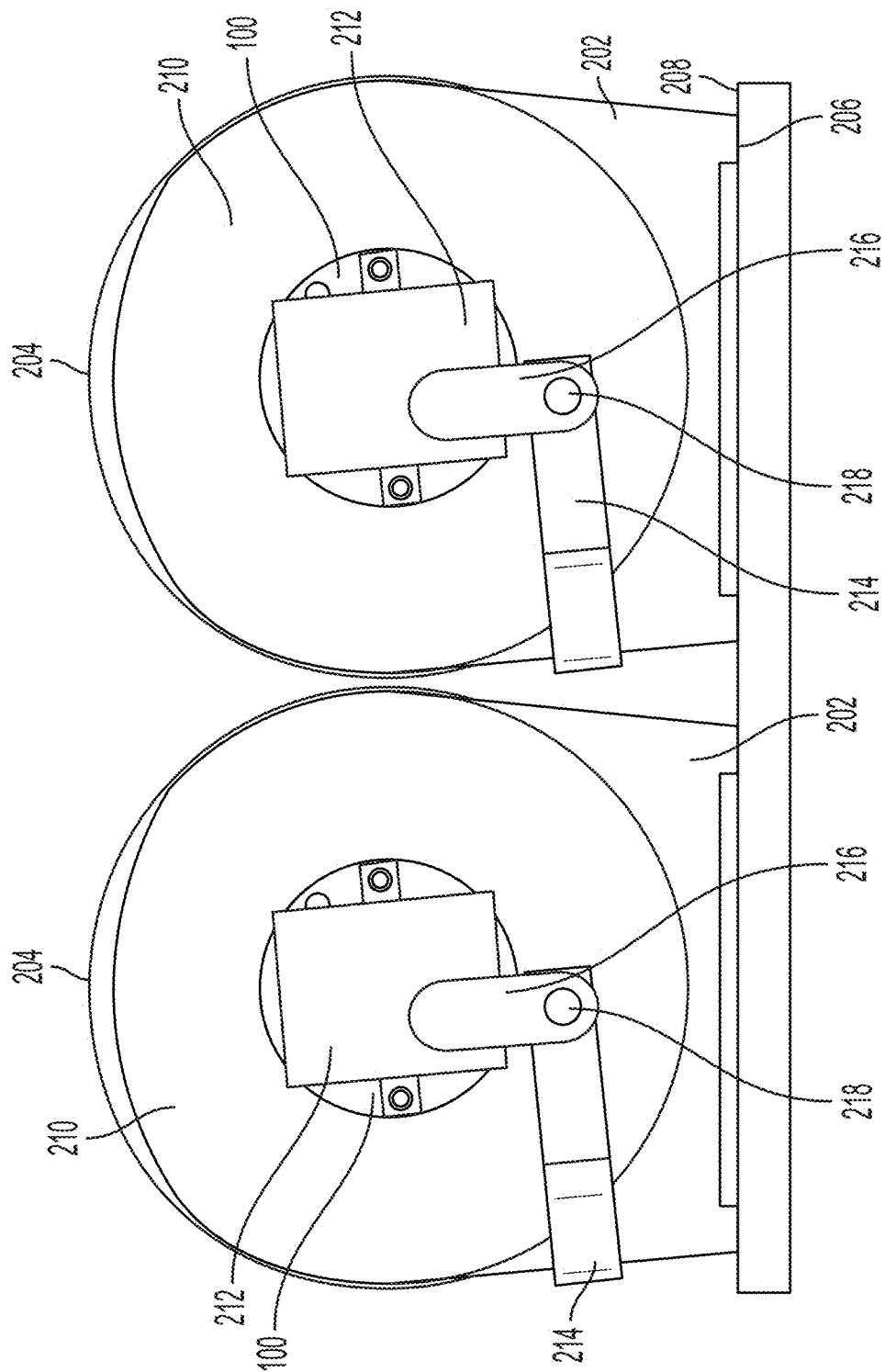
FIG. 4 is an outline view from an end perspective of the pair of roller assemblies of FIG. 2.

Several views of a particular implementation for a manufacturing process 300 including two pairs of roller assemblies 201 is shown in FIG. 2 from a top perspective, and also in FIG. 3 from a bottom perspective and in FIG. 4 from an end perspective. Each roller assembly 201 includes four support segments 202 disposed on both ends of three roller segments 204. Each support segment 202 includes therein a bearing (not shown) that rotatably supports a shaft (not shown) about which the roller segments 204 rotate during operation. Each support segment 202 includes feet 206 that rest on a floor 208 (FIG. 4). Endcaps 210 are disposed at either distal end of each assembly 201, in the typical fashion, to provide cooling water connections through rotary unions and other known services to cool the working roller segments 204 during operation. In the illustrated embodiment, a rotary union 100 is shown disposed within the endcaps 210.

Each rotary union 100 (total of four, disposed one in each endcap 210) includes an external sensor housing 212 onto which an end of a sound conduit 214 is mounted. In each installation, a sound conduit 214 (four total) having an elongate shape that forms two free ends extends between each respective sensor housing 212 and one support segment 202 disposed opposite an end-roller segment 204. An overview of this arrangement is best shown in FIG. 3. As can be seen from this illustration, each sound conduit 214 has an elongate shape and extends along one side of the respective assembly 201. The sound conduit 214 is connected at both ends between one support segment 202 and the respective external sensor housing 212, in direct contact with a sound sensor 218 that may be slidably and resiliently mounted onto the sensor housing 212.

Figure 5:
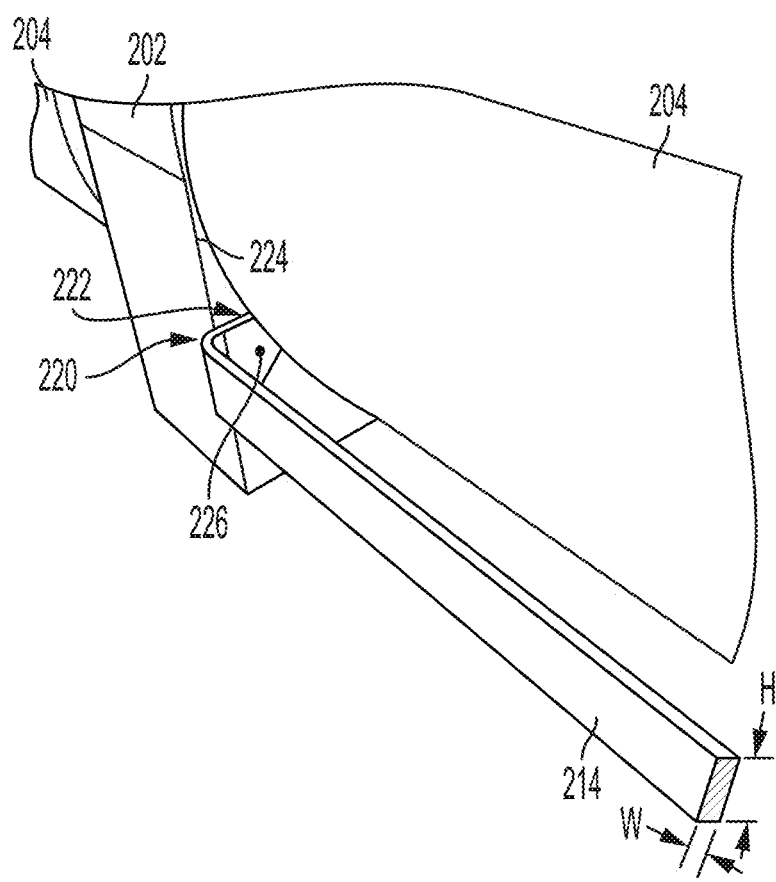
FIG. 5 is a close-up view of a far end of a sound conduit in accordance with the disclosure.
Figure 6:
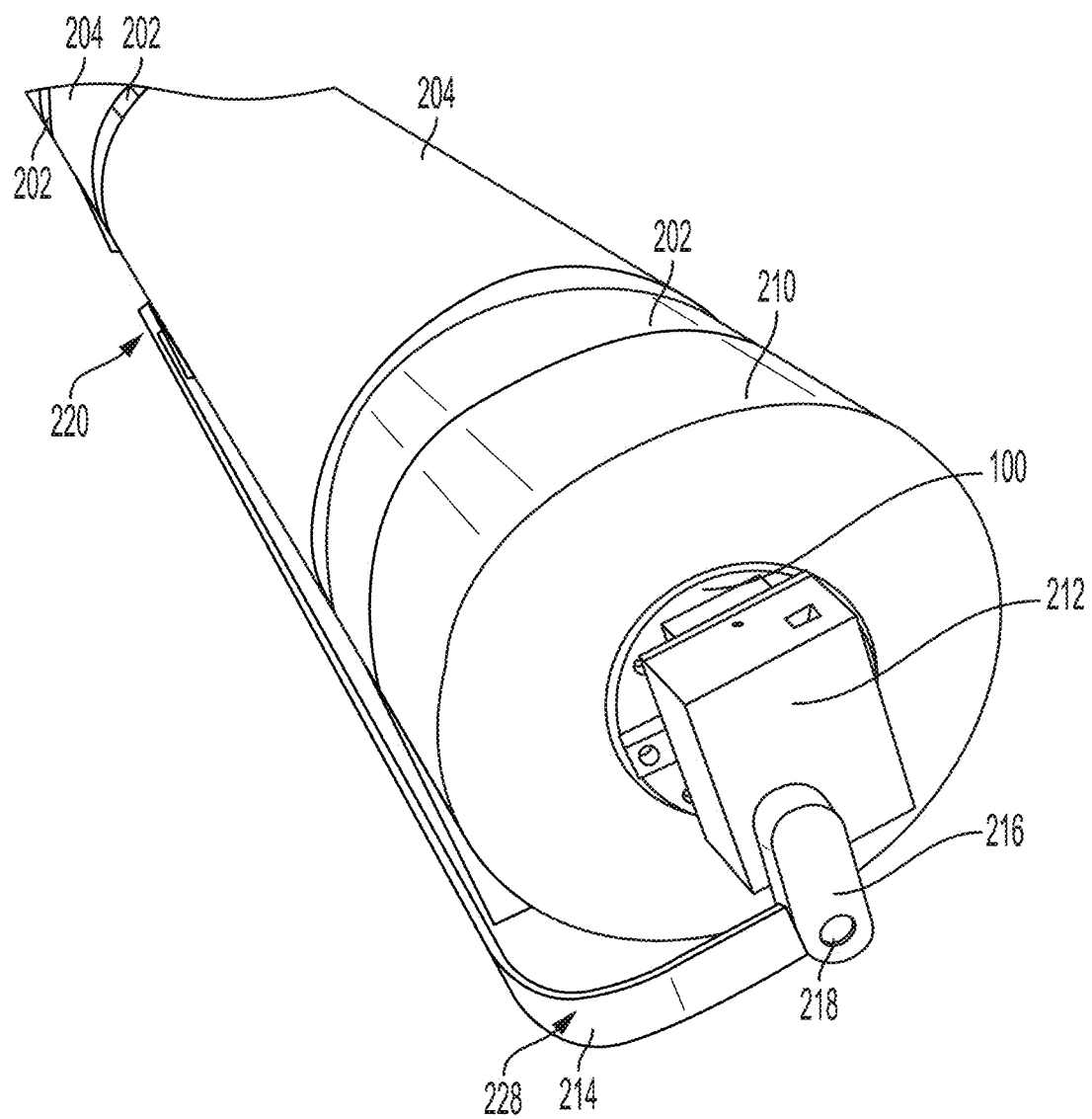
FIG. 6 is a close-up view of a near end of the sound conduit of FIG. 5.

Each rotary union 100 includes the external sensor housing 212, which encloses various other components of the union and includes, among other structures, a slotted holder 216 that partially surrounds a sound sensor 218 and that supports an end of the sound conduit 214. More specifically, and as shown in FIGS. 5 and 6, the sound conduit 214 is formed by an elongate rectangular cross-section bar of material having a 90-degree bend on each end, although other shapes and angles may be used. In the illustrated embodiment, the sound conduit 214 has a rectangular cross-section having a width, W, and a height, H (FIG. 5). As shown, the sound conduit 214 is made from aluminum flat bar stock measuring 0.125 inches wide (W) (3.175 mm) by 0.750 inches high (H) (19.05 mm) by 32.0 inches long (81.28 cm). The sound conduit 214 may be made from aluminum, or copper, which have been found to have good sound propagation properties.

It is noted that, in general, light or less dense but resilient materials are better suited to carry sound or conduct vibrations better than dense, heavy materials. A material's elasticity, springiness or ductility is also important for transmitting sound vibrations. For example, less elastic substances such as hard foams and paper are more likely to absorb sound rather than carry it. In an industrial setting, heavier metals such as steel are sometimes too dense or heavy to effectively transmit sound waves or vibrations over useful distances. Materials that are better suited for transmitting sound waves include metals such as aluminum, and hard substances like diamond. With respect to the present disclosure, different materials with different form factors were tested. For example, steel, aluminum and copper materials formed as solid bars, hollow tubes, and threaded rods were tested, and it was determined that the flat bar stock made from aluminum had the best sound propagation properties for this particular application.

Material properties that can be considered when selecting an appropriate material to transmit or conduct sound can also be determined when considering the formula for the speed of sound in solids. As is known, the velocity of a sound wave is equal to the square root of the elastic property divided by the density of the object. In other words, the less dense an object is, the faster sound travels, and the more elastic it is, the faster sound travels. An object will therefore conduct sound slower if it is not very elastic and is very dense. For this reason, aluminum, and also copper, are suited for sound-conducting applications, especially in industrial settings where tolerance to harsh environmental conditions is also desirable.

Sound travels at one of the fastest rates through aluminum, at 6,320 meters per second. This is because aluminum is not particularly dense—meaning that it has little mass in a given volume—and is extremely elastic and capable of changing shape easily. Note that a material's elasticity tends to fluctuate more than its density and is therefore considered more important for understanding the speed of sound through the given material.

The next-fastest speed for sound is 4,600 meters per second in copper. The elasticity of copper and its ability to vibrate in place easily permit sound waves to travels through solid copper quickly. However, copper's higher density than aluminum explains why sound travels slower in copper than it does in aluminum. The ability of the sound waves to enter into the material, and also to be transmitted effectively to the sound sensor 218, are also important.

In the illustrated embodiments, a far end 220 of each sound conduit 214 includes a bend that presents a flat surface 222 that sits flush against a flat side surface 224 of a side of a support segment 202, as shown in FIG. 5. An area along the side surface 224 at which the far end 220 is attached is selected such that it is adjacent to an area of an internal bearing (not shown) housed within the support segment 202. During operation, noise or vibration that may be generated by a failing bearing will be transmitted to the side surface 224.

The relatively large contact area between the flat surface 222 of the far end 220 of the sound conduit 214, and the flat surface on the side surface 224 of the support segment 202, is effective in transferring any noise waves or vibrations into the sound conduit 214. For maintaining a good connection between the far end 220 and the side surface 224, any fastener can be used. In the illustrated embodiment, a magnet 226 embedded into the sound conduit 214 is used, which advantageously permits not only the simple installation of the sound conduit 214 but also avoids creating any internal stresses in the sound conduit 214 and/or the material around the side surface 224 to permit the clear and unhindered sound propagation across the interface between the flat surface 222 and the side surface 224.

A near end 228 of each sound conduit 214 is flexibly engaged within a slot in the slotted holder 216 and in direct contact with the sound sensor 218. An exploded view of this arrangement to aid in the understanding of the disclosure is shown in FIG. 7.

Figure 7:
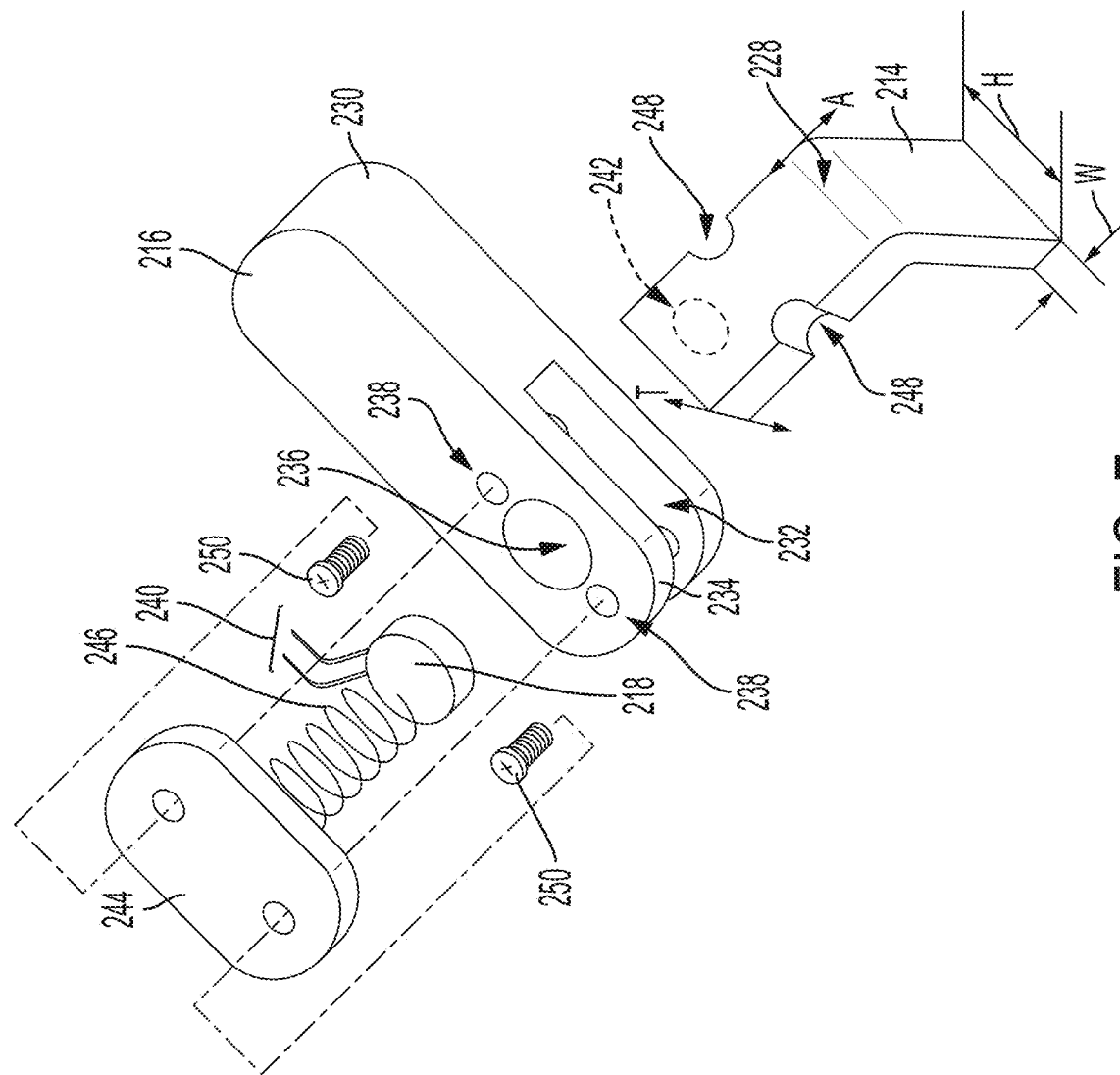
FIG. 7 is an exploded view of a portion of the structures shown in FIG. 6.

In reference to FIG. 7, the slotted holder 216 is shown removed from the housing 212 and includes a body 230 forming a slot 232. The slot 232 is flanked by at least one wall 234 that forms a bore 236 having one or more threaded openings 238 in surrounding relation. The bore 236 extends through the wall 234 and is open to the slot 232. As shown, the wall 234 has a generally uniform thickness and the bore 236 extends perpendicularly through the wall 234 along its thickness. The sound sensor 218 is slidably disposed within the bore 236 such that it is free to move or vibrate along a bore centerline. The sensor 218 may include lead wires 240 with strain relief features that permit the sensor 218 to move within the bore, for example, over a distance of 0.125 inches (3.175 mm) during operation.

The sensor 236 with lead wires 238 connected is retained within the bore 236 from both axial ends of the bore 236. In an assembled condition, the sensor 218 rests directly onto an area 242 (marked with a dashed-line circle) close to the end of one side of the sound conduit 214. In the embodiment shown, the sensor 218 has a cylindrical shape that includes a flat face that has a flush connection or interface with the flat area 242. At its opposite end, or its outer side, the sensor 218 is retained in the bore 236 by a cover or cap 244 that is installable to cover the free end of the bore 236 that contains the sensor 236. A spring or resilient element 246 is disposed between the sensor 246 and the cap 244.

The resilient element 246 is in a compressed condition as installed to provide a biasing force tending to push the sensor 218 away from the cap 244 and against the area 242 on the sound conduit 214. The sensor 218 also has a clearance fit within the bore 236. A spring constant of the resilient element 246 is selected such that it does not overly press the sensor 236 onto the area 242. In this way, a resilient mount is provided that maintains freedom of motion of the sensor 236 to vibrate along with the end of the sound conduit 214 without appreciably dampening the vibration and, thus, reducing the fidelity and resolution of noise signals provided by the sensor 218. To promote this mounting flexibility, and also to retain the near end 228 of the sound conduit 214 in engagement with the slotted holder 216, two slots 248 are formed on opposite sides of the rectangular bar shape of the sound conduit 214 that slidably engage the bodies of two fasteners 250 disposed through the openings 238 and located on either side of the bore 236. The slots 248 are sized such that they permit free motion and vibration of the near end 228 of the sound conduit 214 in a transverse direction, T, which coincides with the centerline of the bore 236, but prevents a pullout of the sound conduit 214 in an axial direction, A, as denoted by two-sided arrows is FIG. 7.

Figure 8:
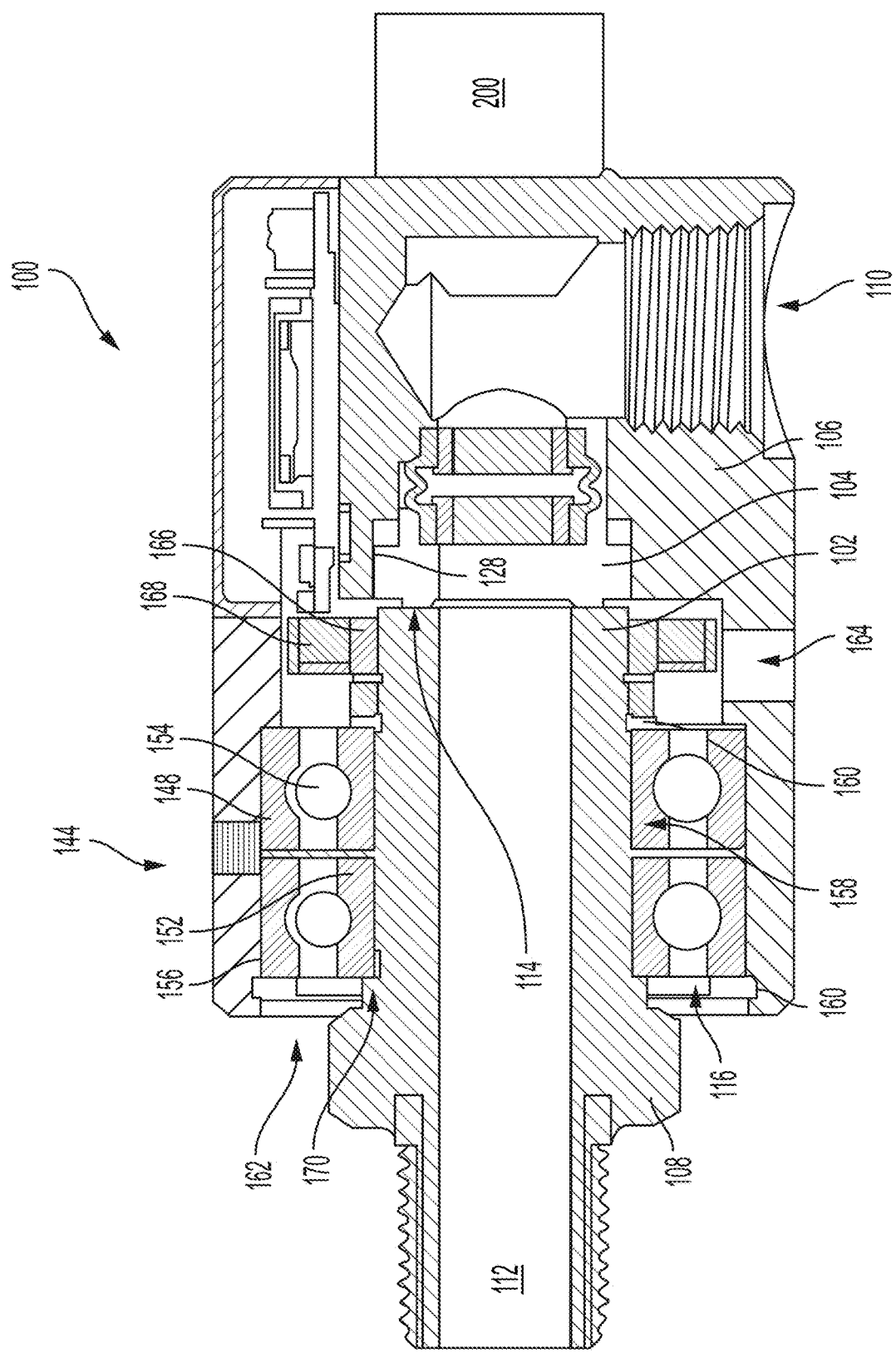
FIG. 8 is an outline view of the pair of rollers from an end perspective.

A cutaway view of a rotary union 100, which can be used, for example, in place of the rotary unions shown in FIG. 1, is shown in FIG. 8. In reference to this figure, the rotary union 100 includes a rotating seal member 102 and a non-rotating seal member 104 that is axially moveable relative to a housing 106. The housing may be mounted onto a structure that is stationary and supports the rollers. A segmented conduit or media channel 112 extends through the housing 106, and also through rotating and non-rotating seal members 102 and 104 respectively. Portions of the media channel 112 are defined in different components of the rotary union 100 to provide a fluid passageway through the rotary union 100 when the rotating and non-rotating seal members 102 and 104 are engaged. The media channel 112 may be fluidly connected with an internal cavity of a roller such that fluid provided to the housing, which is stationary, is carried in a sealed fashion into the respective roller while the roller is rotating.

The rotating seal member 102 is embodied here integrated with a rotating machine component 108 that is connected to the roller. A mechanical face seal created when the rotating seal member 102 is engaged with the non-rotating seal member 104 seals the media channel 112 for transferring a fluid medium from a fluid inlet 110 of the housing 106 to an outlet 111 formed at the end of the rotating machine component 108, as is known in the art. The rotating machine component 108 has a bore that defines a portion of the media channel 112 and further defines features at an end opposite the outlet 111 that define the rotating seal member 102.

The non-rotating seal member 104 is slidably and sealably disposed within a bore 128 of the housing 106. The structural arrangement permitting sliding of the non-rotating seal member 104 relative to the non-rotating machine component 110 enables the selective engagement and disengagement of the non-rotating seal member 104 with the rotating seal member 108, and compensates for axial displacement that may be present between the rotating machine component 108 and the housing 106. It should be appreciated that in an application such as this, a spring (not shown) may urge the rotating and non-rotating seal members together or apart.

The selective variation of fluid pressure within the media passage 112 during operation of the rotary union 100 yields net hydraulic forces that are applied to urge the moveable non-rotating seal member 104 to move relative to the housing 106 such that a sealing engagement can occur along an interface 114 between the rotating seal member 102 and the non-rotating seal member 104. Extension of the seal member 104 relative to the housing 106 and engagement of corresponding sealing surfaces formed at opposing faces of the rotating seal member 102 and the non-rotating seal member 104 create a fluid passage along the media channel 112. The non-rotating seal member 104 may be keyed into its receiving bore in the housing 106 to prevent its rotation, especially when sealing engagement exists between the rotating seal member 102 and the non-rotating seal member 104.

The housing 106 sealably engages the non-rotating seal member 104, and defines various hydraulic chambers therein for the selective engagement between the rotating and non-rotating seal members 102 and 104. More specifically, the housing 106 includes stepped bore portion 116 that accommodates therein and sealably engages one end of an expanding seal 118, which is formed with a bellows portion 120 that is disposed between straight portions 122. The expanding seal 118 may be formed of an elastic material such as rubber, TPE, a fluoro-elastomer, and other materials, and includes rigid collars 124 along the straight portions 122. The expanding seal 118 engages the stepped bore portion 116 at one end, and a recess 126 formed in the non-rotating seal member 104 at another end. When the non-rotating seal member 104 is urged by hydraulic forces to move towards engagement with the rotating seal member 102, the expanding seal 118 expands in an axial direction as the bellows portion 120 increases in length along a centerline 128 of the expanding seal 118, which in the illustrated embodiment has a generally cylindrical shape that is disposed concentrically with the rotating machine component 108 and the rotating seal member 102.

The rotary union 100 further includes two roller bearing assemblies 142 disposed between the housing 106 and the rotating machine component 108. More specifically, the housing 106 forms a bearing region 144 that accommodates one or more bearings 146, two of which are shown in the illustrated embodiment. The bearings 146 are shown as ball bearings, each including an outer race 148, an inner race 152, and a plurality of balls 154 disposed there-between. Each outer race 148 and inner race 152 is formed as a ring, where the outer race 148 radially engages an inner generally cylindrical surface 156 of the bearing region 144 of the housing 106, and where the inner race 152 engages an outer generally cylindrical surface 158 of the rotating machine component 108.

The bearings 146 are axially constrained within the inner generally cylindrical surface 156 by C-rings 160. When the C-rings 160 are sequentially removed, the entire assembly of rotating and non-rotating components and seal members can be removed from the housing 106 through a front opening 162 to advantageously facilitate assembly, disassembly and service of the rotary union 100. An inner C-ring 160 is disposed closer to the non-rotating seal member 104 and is engaged along an inner diameter thereof around the rotating machine component 108. An outer C-ring 160, which is disposed closer to the front opening 162, is engaged along an outer diameter thereof within the inner generally cylindrical surface 156 of the bearing region 144 of the housing 106. The housing 106 further forms a drain opening 164 adjacent the sealing interface between the rotating seal member 102 and the non-rotating seal member 104.

During operation, the roller bearings support the rollers carrying the steel slab. Water or another coolant may enter the housing 106 through the inlet 110, and from there pass into the roller through the media channel 112. An area of the housing 106 adjacent the inlet 110 may thus be the coolest area onto the housing as it is continuously cooled by the cool incoming water through the inlet. Onto this area, a sensor 200 is mounted that can acoustically acquire signals indicative of the operating health of the mechanical face seal and also the bearings supporting the roller, such as the bearings included within the support segments 202 previously described and shown, for example, in FIGS. 2 and 3. The area onto which the sensor 200 is mounted provides direct access to a sensing element to detect sounds or other vibrations generated within the union, and also provides an actively cooled surface on which the sensor can be mounted such that electronics and other sensitive components are not affected by the heat present in the surrounding operating environment of the union.

Figure 9:
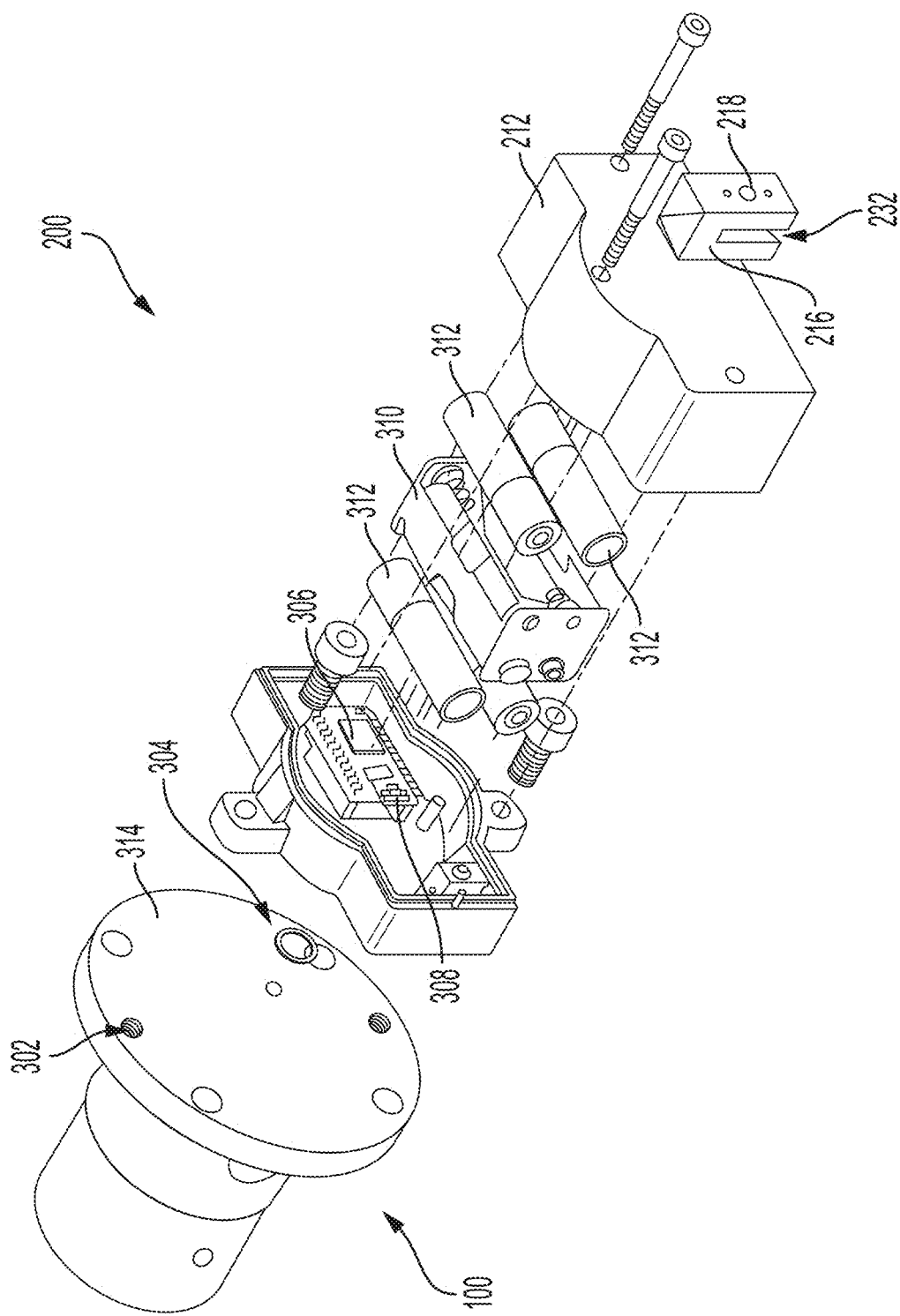
FIG. 9 is an exploded view of a sensor system in accordance with the disclosure.

An exploded view of one embodiment for the sensor 200 is shown in FIG. 9. In reference to this illustration, the rotary union 100 and its end surface is shown on the left side of the figure. The surface area for mounting the sensor 200, which is shown in exploded view, may be adjacent to a set of union jacking screws 302, i.e., screws used to extract the union from a bore in which it is installed during operation. A rubber seal 304 is mounted onto the outer union surface to protect an internal space from debris such as water, dust, slag and the like from damaging the sensor element. The rubber seal also provides a thermal break to reduce conductive heat input into the sensor.

Figure 10:
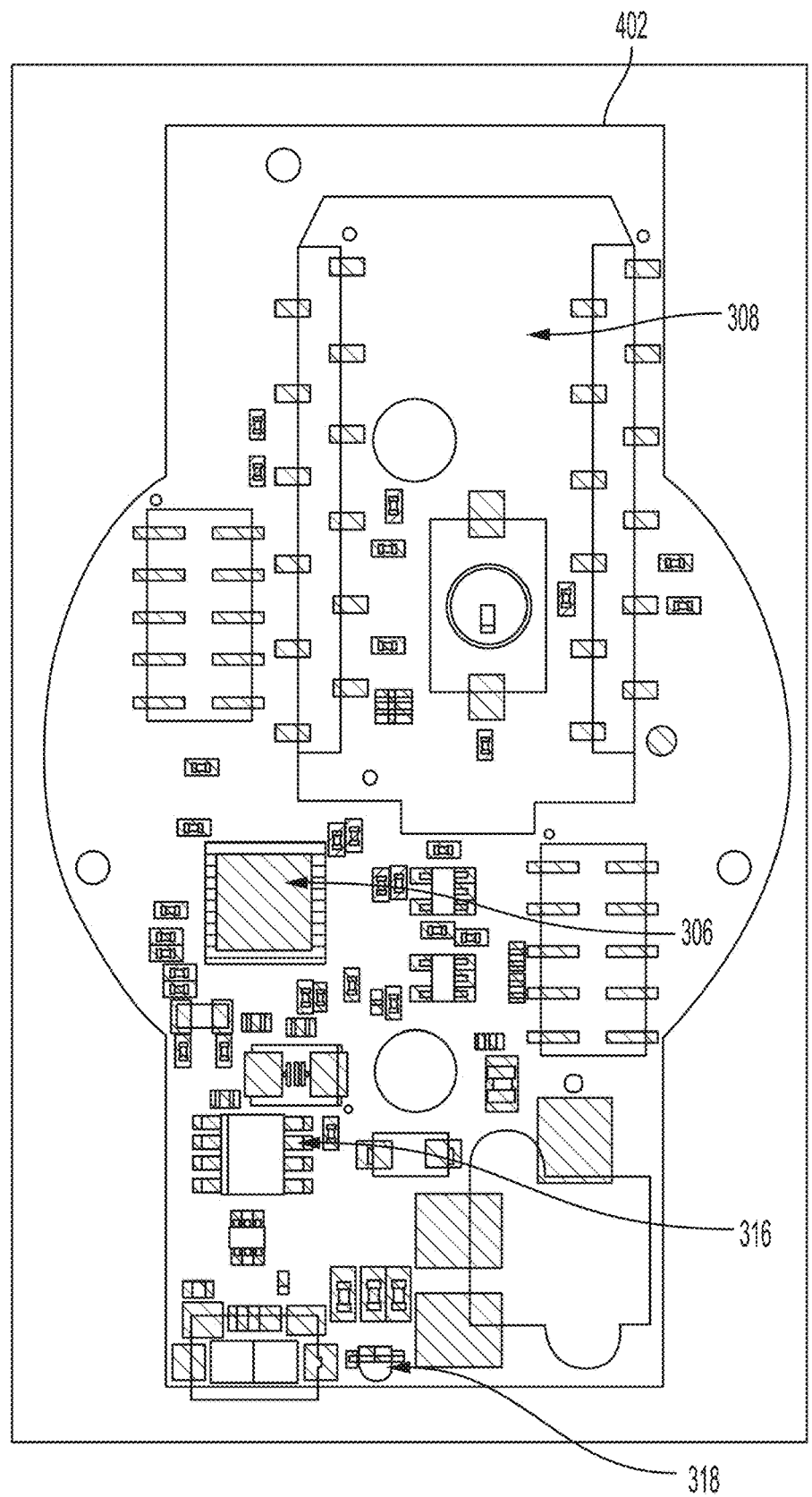
FIG. 10 is a schematic view of a sensor board in accordance with the disclosure.

The sensing element is an audio sensor or microphone, e.g. the sound sensor 218 described above, which is mounted into the external sensor housing 212. The circuit may also include structures and components such as a microcontroller 306 and wireless transmitter 308, as is also shown in FIG. 10. A battery holder 310 includes receptacles for cell batteries 312 that provide power to the operate the sensor, microcontroller, wireless transmitter and other components. Use of batteries facilitates the flexible mounting of the sensor 200 onto any location, but it should be appreciated that an external power source can also be used to power the sensor. The external sensor housing 212 encloses and seals all components, protecting them from radiative heat from the environment and also contamination from water or other debris. During operation, an outer plate 314 of the union 100 also acts as a thermal barrier that prevents heat input to the sensor 200 from the operation and from the rollers 204.

As shown in FIG. 10, an integrated sensor circuit 402 can include the wireless transmitter 306, which can exchange information to and from the sensor 200 and a base or external controller, the microcontroller 306, for operating the sensor 218 and for processing signals, a local data storage 316, and optional system state indication LEDs 318. During operation, sound signals received by the sound sensor 218 may be processed locally or remotely and evaluated for an indication of the operating health of the mechanical face seal and the roller bearings. For example, a grinding noise may indicate a mechanical failure at the face seal interface or at the bearings. The controller, depending on the pitch, frequency and intensity of the noise may be trained or programmed to distinguish between failures of different components and also the extent of the failure. The controller may further be trained or programmed to estimate the remaining life of the components based on the frequency, amplitude and pitch of the noise generated by the operating union even in the absence of an imminent or initiated mode of failure.

Figure 11:
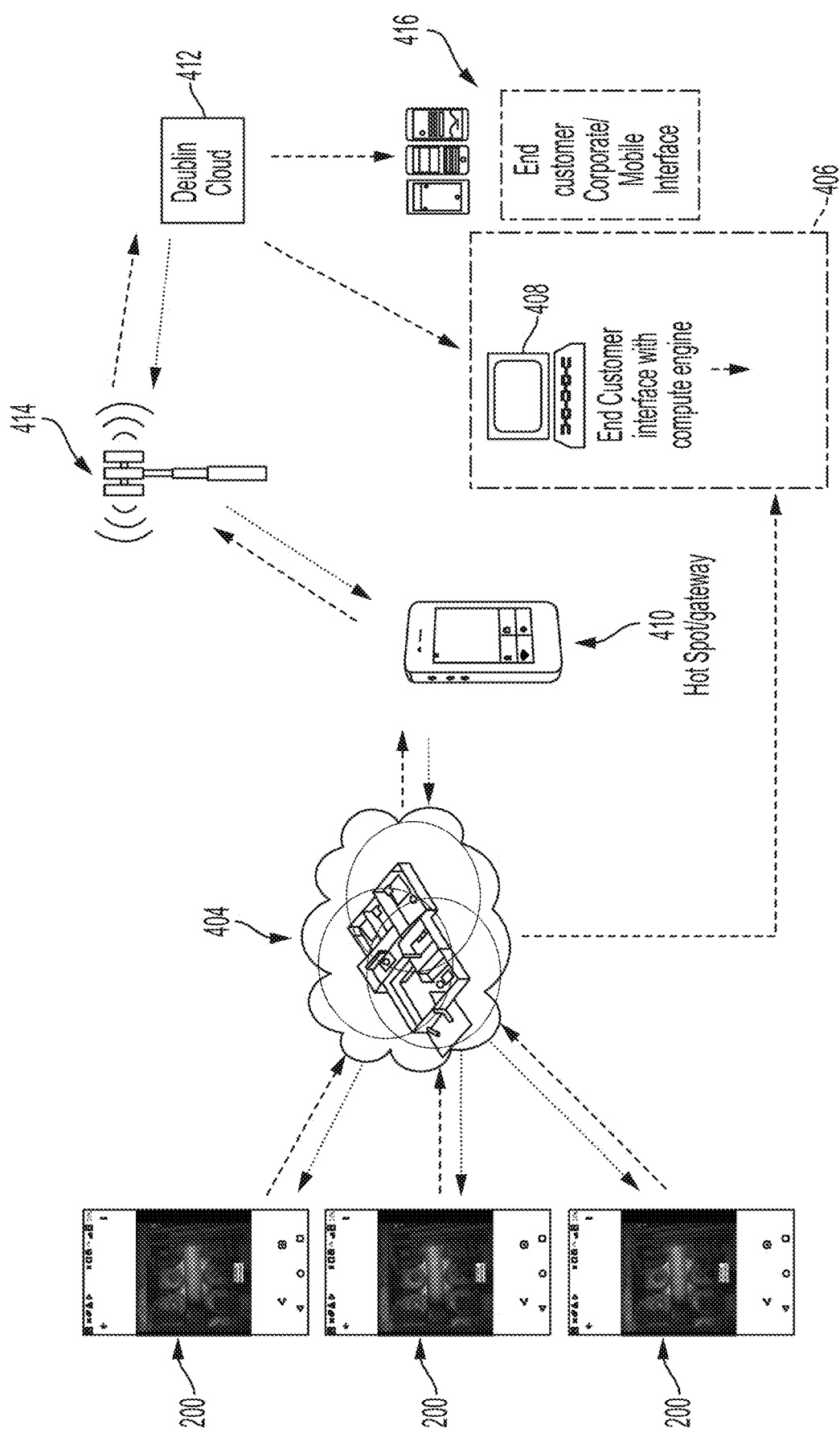
FIG. 11 is a schematic view of a network in accordance with the disclosure.

A network for monitoring operating conditions of one or more unions in the same or different facilities is shown in FIG. 11. The network may include a plurality of sensors 200, shown on the left of the FIG. 3 shown), which all communicate with a mesh network 404. The mesh network 404 may cover an entire area in which the sensors are mounted and operating, and may further include a fast Fourier transform (FFT) processor functionality implemented in hardware or software that detects and estimates the frequency of the noise generated at each union and acquired by each sensor on the network. The frequency of the noise may be one of many parameters used to diagnose the operating state of each of the plurality of unions. Information from the FFT processor may be provided locally to an end customer interface 406, which also may include a compute engine 408 that correlates this information with an operating state indicated by each of the plurality of sensors 200.

The information from the FFT processor may be also provided to a local hot spot or gateway 410 and, from there, to a cloud data environment 412 through, for example, a cellular network 414, or a wide area network or the internet. Information from the cloud may then be disseminated locally or to mobile devices 416 operating at the end customer or elsewhere, for example, via a mobile interface.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A rotary union assembly adapted for rotatably supporting a shaft relative to a first support segment, the shaft defining an axis about which a roller rotates, the rotary union assembly comprising:
   a rotary union that includes a housing, the rotary union adapted to be connected between the support segment and the shaft, the rotary union configured to provide a cooling water fluid pathway to an interior of the roller;
   a sensor disposed within a sensor housing, the sensor housing connected to the housing of the rotary union;
   a sound conduit having first and second ends, the first end of the sound conduit being connected to the sensor housing, and the second end of the sound conduit being adapted to be connected to a second support segment disposed opposite the first support segment along the shaft relative to the roller;
   wherein the sensor includes a sensing element in physical contact with the first end of the sound conduit, the sensing element configured to provide a signal in response to vibration present along the sound conduit.

2. The rotary union assembly of claim 1, wherein the sound conduit has an elongate shape that is adapted to extend generally in parallel with the shaft between the first and second segments.

3. The rotary union of claim 1, wherein the second end of the sound conduit includes a bend that presents a flat surface that sits flush against a flat side surface of a side of the second support segment.

4. The rotary union of claim 1, further comprising a magnet embedded into the second end of the sound conduit, the magnet adapted to connect the second end of the sound conduit to the second support segment.

5. The rotary union of claim 1, wherein the sensor housing includes a slot, and wherein the first end of the sound conduit is flexibly engaged within the slot.

6. The rotary union of claim 5, wherein the sensor housing further includes a slotted holder that includes a body forming the slot; wherein the slot is flanked by at least one wall that forms a bore having one or more threaded openings in surrounding relation, wherein the sensing element is slidably retained within the bore, and wherein the bore extends through the at least one wall and is open to the slot such that it directly contacts the first end of the sound conduit.

7. The rotary union of claim 6, further comprising a biasing element disposed in the bore between the sensing element and a cap that closes an end of the bore opposite the sound conduit, wherein the biasing element imparts a biasing force tending to push the sensing element into contact with the first end of the sound conduit.

8. The rotary union of claim 1, wherein the sound conduit is made from aluminum flat bar stock measuring 0.125 inches wide (W) (3.175 mm) by 0.750 inches high (H) (19.05 mm) by 32.0 inches long (81.28 cm).

9. The rotary union of claim 8, wherein the sound conduit is made from aluminum or copper.

10. The rotary union of claim 1, wherein the sensor further includes a battery operating the sensor element and a wireless communication device, and wherein the wireless communication device is configured to receive and relay the signal remotely.

11. A method for acoustically diagnosing a fault in a bearing supporting a steel roller in a steel manufacturing process, the steel roller supported by first and second support segments, one on each end of the steel roller, each support segment including a respective bearing for rotatably mounting the steel roller, the method comprising:
   providing a rotary union that includes a housing at one end of the steel roller, the rotary union connected between the first support segment and the steel roller, the rotary union configured to provide a cooling water fluid pathway to an interior of the steel roller;
   providing a sensor disposed within a sensor housing, the sensor housing connected to the housing of the rotary union;
   providing a sound conduit having first and second ends, the first end of the sound conduit being connected to the sensor housing, and the second end of the sound conduit being connected to the second support segment disposed opposite the first support segment along the steel roller;
   wherein the sensor includes an acoustical sensing element in physical contact with the first end of the sound conduit and with the housing of the rotary union, the sensing element configured to provide a signal in response to vibration present along the sound conduit or in the housing of the rotary union; and
   wherein sound present in the housing is indicative of a failure in the bearing of the first support segment, and sound present in the sound conduit is indicative of a failure in the bearing of the second support segment.

12. The method of claim 11, wherein the sound conduit has an elongate shape that is adapted to extend generally in parallel with the shaft between the first and second support segments.

13. The method of claim 11, wherein the second end of the sound conduit includes a bend that presents a flat surface that sits flush against a flat side surface of a side of the second support segment.

14. The method of claim 11, further comprising providing a magnet embedded into the second end of the sound conduit, the magnet connected to the second end of the sound conduit to the second support segment.

15. The method of claim 11, wherein the sensor housing includes a slot, and wherein the first end of the sound conduit is flexibly engaged within the slot.

16. The method of claim 15, wherein the sensor housing further includes a slotted holder that includes a body forming the slot; wherein the slot is flanked by at least one wall that forms a bore having one or more threaded openings in surrounding relation, wherein the sensing element is slidably retained within the bore, and wherein the bore extends through the at least one wall and is open to the slot such that it directly contacts the first end of the sound conduit.

17. The method of claim 16, further comprising a biasing element disposed in the bore between the sensing element and a cap that closes an end of the bore opposite the sound conduit, wherein the biasing element imparts a biasing force tending to push the sensing element into contact with the first end of the sound conduit.

18. The method of claim 11, wherein the sound conduit is made from aluminum flat bar stock measuring 0.125 inches wide (W) (3.175 mm) by 0.750 inches high (H) (19.05 mm) by 32.0 inches long (81.28 cm).

19. The method of claim 18, wherein the sound conduit is made from aluminum or copper.

20. The method of claim 11, wherein the sensor further includes a battery operating the sensor element and a wireless communication device, and wherein the wireless communication device is configured to receive and relay the signal remotely.

* * * * *